(12) United States Patent
Nadger et al.

(10) Patent No.: US 11,347,576 B2
(45) Date of Patent: May 31, 2022

(54) ROOT CAUSE ANALYSIS OF NON-DETERMINISTIC PERFORMANCE ANOMALIES

(71) Applicant: VMWARE, INC., Palo Alto, CA (US)

(72) Inventors: Girish Nadger, Palo Alto, CA (US); Somenath Pal, Bangalore (IN); Somaresh Sahu, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 89 days.

(21) Appl. No.: 16/599,142

(22) Filed: Oct. 11, 2019

(65) Prior Publication Data

US 2021/0026724 A1   Jan. 28, 2021

(30) Foreign Application Priority Data

Jul. 23, 2019 (IN) .............................. 201941029698

(51) Int. Cl.
*G06F 11/07* (2006.01)

(52) U.S. Cl.
CPC ........ *G06F 11/079* (2013.01); *G06F 11/0709* (2013.01); *G06F 11/0751* (2013.01)

(58) Field of Classification Search
CPC ............... G06F 11/008; G06F 11/0709; G06F 11/0751; G06F 11/079; G06F 11/0793
See application file for complete search history.

(56) References Cited

U.S. PATENT DOCUMENTS

| | | | |
|---|---|---|---|
| 6,965,845 B2 | 11/2005 | Ohsie et al. | |
| 7,890,813 B2 | 2/2011 | Usynin et al. | |
| 8,185,781 B2 | 5/2012 | Chen et al. | |
| 9,043,647 B2 | 5/2015 | Sadaphal et al. | |
| 9,122,605 B2 | 9/2015 | Bell et al. | |
| 9,558,056 B2 * | 1/2017 | Sasturkar | H04L 43/04 |
| 10,693,711 B1 * | 6/2020 | Garg | H04L 41/0631 |
| 2007/0168915 A1 | 7/2007 | Fabbio et al. | |
| 2009/0327195 A1 * | 12/2009 | Iscen | G06N 5/042 |
| | | | 706/47 |
| 2013/0232382 A1 | 9/2013 | Jain et al. | |
| 2019/0165988 A1 * | 5/2019 | Wang | H04L 41/0631 |
| 2019/0286504 A1 * | 9/2019 | Muntes-Mulero | G06F 11/079 |
| 2021/0026723 A1 | 1/2021 | Nadger et al. | |

OTHER PUBLICATIONS

Non-Published Commonly Owned Related U.S. Appl. No. 16/599,134 with similar specification, filed Oct. 11, 2019, 36 pages, VMware, Inc.

* cited by examiner

*Primary Examiner* — Joseph R Kudirka
(74) *Attorney, Agent, or Firm* — Adeli LLP

(57) ABSTRACT

Some embodiments of the invention provide methods for performing root cause analysis for non-deterministic anomalies in a datacenter. For instance, the method of some embodiments identifies a root cause for degradation in performance of one or more components in a network of the datacenter. This method collects and generates resource consumption data regarding resources consumed by a set of components in this network. The method performs a first analysis on the collected and/or generated data to identify an instance in time when one or more components, while still operational, are possibly suffering from performance degradation. The method then performs a second analysis on the collected and/or generated data associated with the identified time instance to identify a root cause of a performance degradation of at least one component in the network.

18 Claims, 9 Drawing Sheets

ROOT CAUSE ANALYSIS OF NON-DETERMINISTIC PERFORMANCE ANOMALIES

RELATED APPLICATIONS

Benefit is claimed under 35 U.S.C. 119(a)-(d) to Foreign Application Serial No. 201941029698 filed in India entitled "ROOT CAUSE ANALYSIS OF NON-DETERMINISTIC PERFORMANCE ANOMALIES", on Jul. 23, 2019, by VMWARE, Inc., which is herein incorporated in its entirety by reference for all purposes.

The present application is related in subject matter to U.S. patent application Ser. No. 16/599,134, filed Oct. 11, 2019, now published as U.S. Patent Publication 2021/0026723, which is incorporated herein by reference.

BACKGROUND

Many datacenters today run complex, dynamic, and heterogeneous infrastructures. Managing such heterogeneous systems is very complicated due to the large number of physical/virtual compute and network resources that often exist in private and public cloud environments. An efficient performance analysis system is critical to enable the management and network orchestrator with insights into such heterogeneous infrastructures. Non-deterministic characteristic of the performance anomalies in such eco-systems makes it difficult to identify the root-cause analysis. Conventional performance analysis methods and systems are not very accurate and precise and are not designed to provide the automated root-cause analysis of performance anomalies.

BRIEF SUMMARY

Some embodiments of the invention provide methods for performing root cause analysis for non-deterministic anomalies in a datacenter. For instance, the method of some embodiments identifies a root cause for degradation in performance of one or more components in a network of the datacenter. This method collects and generates resource consumption data regarding resources consumed by a set of components in this network. The set of components in some embodiments includes compute components (e.g., virtual machines (VM), containers, computers, etc.), network components (e.g., switches, routers, ports, etc.), and/or service components (e.g., middlebox components such as firewalls, load balancers, etc.).

The method performs a first analysis on the collected and/or generated data to identify an instance in time when one or more components, while still operational, are possibly suffering from performance degradation. The method then performs a second analysis on the collected and/or generated data associated with the identified time instance to identify a root cause of a performance degradation of at least one component in the network. The identified root cause in some embodiments specifies only one possible reason for the degradation of performance of one or more components. In other embodiments, the root cause identifies one or more reasons for the performance degradation of one or more components.

Examples of performance degradation that this method can detect include VM application slowness, high number of dropped packets at a switch port, high VM disk latency, etc. An example of an identified root cause that this method can specify includes a switch port with a high packet drop rate being the cause for slowing down a VM application. In some embodiments, performance degradation relates to the diminished operational efficiency of one or more datacenter components that are still operational (i.e., that have not failed to operate) in the datacenter.

From the performance data collected and generated for the set of components, the method generates in some embodiments a digital signature representing an operational performance characteristic of the set of components. To identify the root cause of the performance degradation, the second analysis of the method in some embodiments compares the generated signature with several pre-tabulated signatures, each of which is associated with at least one particular root cause for performance degradation. Based on this comparison, the method then selects one pre-tabulated signature as matching the generated signature and identifies the selected pre-tabulated signature's root cause as the root cause of the performance degradation.

The method of some embodiments collects and generates a large amount of data for a large number of components in the network. In some embodiments, this data includes symptom data tuples, metric data tuples, and key performance indicator (KPI) data tuples. Due to the large number of components and the large amount of data associated with these components, the method of some embodiments has to filter out some of the identified components and associated data in order for it to perform root cause analysis regarding the operational degradation of one or more components. This filtering is needed given that the data associated with the performance monitoring can be very granular in nature.

For a particular root cause analysis, the method filters the data by eliminating the components that are not relevant for this analysis. For the remaining components, the method also discards the data tuples that are not relevant to the particular root cause analysis. It then performs the above-mentioned first analysis in order to identify anomalies (e.g., outlier data samples) in remaining data tuples. Each identified anomaly is associated with an instance in time, which then becomes a candidate instance for which the method can perform its second analysis to identify a root cause for a possible performance degradation associated with the identified anomaly.

Before identifying the set of components relevant to a particular root cause analysis, the method of some embodiments defines a graph that includes nodes representing components in the network and links representing the relationship between the components. The method then associates with each node the set of data tuples (e.g., symptom data tuples, metric data tuples, KPI tuples) collected and/or generated for the component that is represented by the node. For the particular root cause analysis, the method then extracts from this graph a sub-graph that is the portion of the graph that is relevant to the particular root cause analysis. It then filters out some of the data tuples associated with the nodes of the extracted sub-graph. The filtered data tuples are the ones that are not relevant to the particular root cause analysis, while the remaining data tuples are the ones that are analyzed to identify anomalies.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
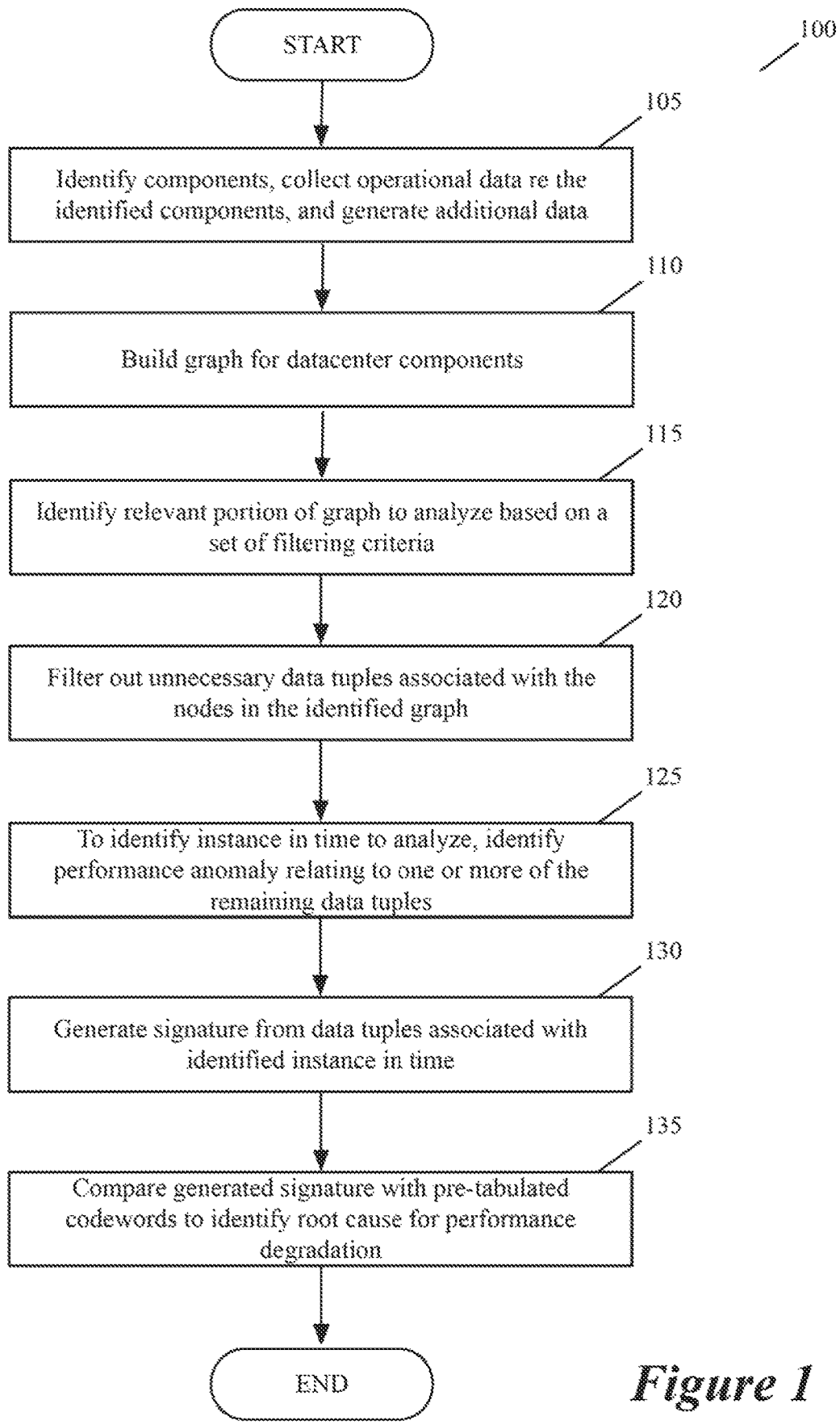
FIG. 1 conceptually illustrates a process that some embodiments use to perform root cause analysis for performance degradation.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide methods for performing root cause analysis for non-deterministic anomalies in a datacenter. For instance, the method of some embodiments identifies a root cause for degradation in performance of one or more components in a network of the datacenter. This method collects and generates resource consumption data regarding resources consumed by a set of components in this network. The method performs a first analysis on the collected and/or generated data to identify an instance in time when one or more components, while still operational, are possibly suffering from performance degradation. The method then performs a second analysis on the collected and/or generated data associated with the identified time instance to identify a root cause of a performance degradation of at least one component in the network.

Examples of collected data in some embodiments include CPU usage data, memory usage data, disk usage data, bandwidth usage data, port operational state data, while examples of generated data would be aggregated data (e.g., aggregated CPU usage data, memory usage data, disk usage data, bandwidth usage data, etc.), rate computation data, etc. Examples of performance degradation that this method can detect include VM application slowness, high number of dropped packets at a switch port, high VM disk latency, etc. An example of an identified root cause that this method can specify includes a switch port with a high drop rate being the cause for slowing down a VM application. In some embodiments, performance degradation relates to the diminished operational efficiency of one or more datacenter components that are still operational (i.e., that have not failed to operate) in the datacenter.

From the performance data collected and generated for the set of components, the method generates in some embodiments a digital signature representing an operational performance characteristic of the set of components. To identify the root cause of the performance degradation, the second analysis of the method in some embodiments compares the generated signature with several pre-tabulated signatures, each of which is associated with at least one particular root cause for performance degradation. Based on this comparison, the method then selects one pre-tabulated signature as matching the generated signature and identifies the selected pre-tabulated signature's root cause as the root cause of the performance degradation.

The method of some embodiments collects and generates a large amount of data for a large number of components in the network. To perform its root cause analysis regarding operation degradation of one or more components, the method of some embodiments filters out some of the identified components and associated data. Specifically, for a particular root cause analysis, the method eliminates the components that are not relevant for this analysis. For the remaining components, the method also discards the data tuples that are not relevant to the particular root cause analysis. It then performs the above-mentioned first analysis in order to identify anomalies (e.g., outlier data samples) in remaining data tuples. Each identified anomaly in some embodiments is associated with an instance in time, which then becomes a candidate instance for which the method can perform its second analysis to identify a root cause for a possible performance degradation associated with the identified anomaly.

Some embodiments use a graph-based approach to identify the components and data tuples to analyze. For instance, the method of some embodiments defines a graph that includes nodes representing components in the network and links representing the relationship between the components. With each node, the method associates the set of data tuples collected and/or generated for the component represented by the node. For the particular root cause analysis, the method identifies a portion of this graph that is relevant to the particular root cause analysis. It then filters out some of the data tuples that are associated with the nodes of the identified portion but are not relevant to the particular root cause analysis. The method then analyzes the remaining data tuples to identify a root cause for a performance degradation.

FIG. 1 conceptually illustrates a process 100 that some embodiments use to perform root cause analysis for performance degradation. To do its analysis, this process uses the above-described graph-based approach. In some embodiments, different operations of the process 100 are performed by different modules of a monitoring system at different times and/or at different rates. These modules in some embodiments perform their respective operations in parallel. Hence, one of ordinary skill will realize that the process 100 just provides one example of a sequence of operations that are performed to identify a root cause for a performance degradation that is associated with one instance in time.

As shown, the process 100 initially identifies (at 105) components of a datacenter for monitoring, collects operational data regarding the identified components, and generates additional data from the collected data. The identified set of components in some embodiments include compute components (e.g., virtual machines, containers, computers, etc.), network components (e.g., switches, routers, ports, etc.), and/or service components (e.g., middlebox components, such as firewalls, load balancers, etc.).

In some embodiments, the data collected (1) for the compute components includes CPU usage data, memory usage data, disk usage data, bandwidth usage data, etc., (2) for the network components includes bandwidth usage data, packet drop data, etc., and (3) for the service components includes data regarding the operations of the service nodes (e.g., for a firewall, number of allowed packets, number of rejected packets, etc.). As collected, some or all of this data includes in some embodiments the symptom data tuples, the metric data tuples, and the key performance indicator (KPI) data tuples. In other embodiments, some or all of the symptom data, metric data, and KPI data is generated from the data that is collected at 105. In some embodiments, the performance monitoring system iteratively (e.g., continuously or parodically) identifies components in a datacenter and collects/generates data regarding these components.

At 110, the process 100 defines a graph that includes nodes representing components in the datacenter network and links representing the relationship between the components. The process associates with each node the set of data tuples collected/generated for the component represented by the node. In some embodiments, these data tuples (that are associated with the nodes) include the symptom data tuples, the metric data tuples and the KPI data tuples. Also, in some embodiments, the symptom data tuples are deterministic data tuples, while the metric and KPI data tuples are non-deterministic data tuples. The performance monitoring system in some embodiments iteratively (e.g., continuously or periodically) updates the graph that it defines for the datacenter.

Figure 2:
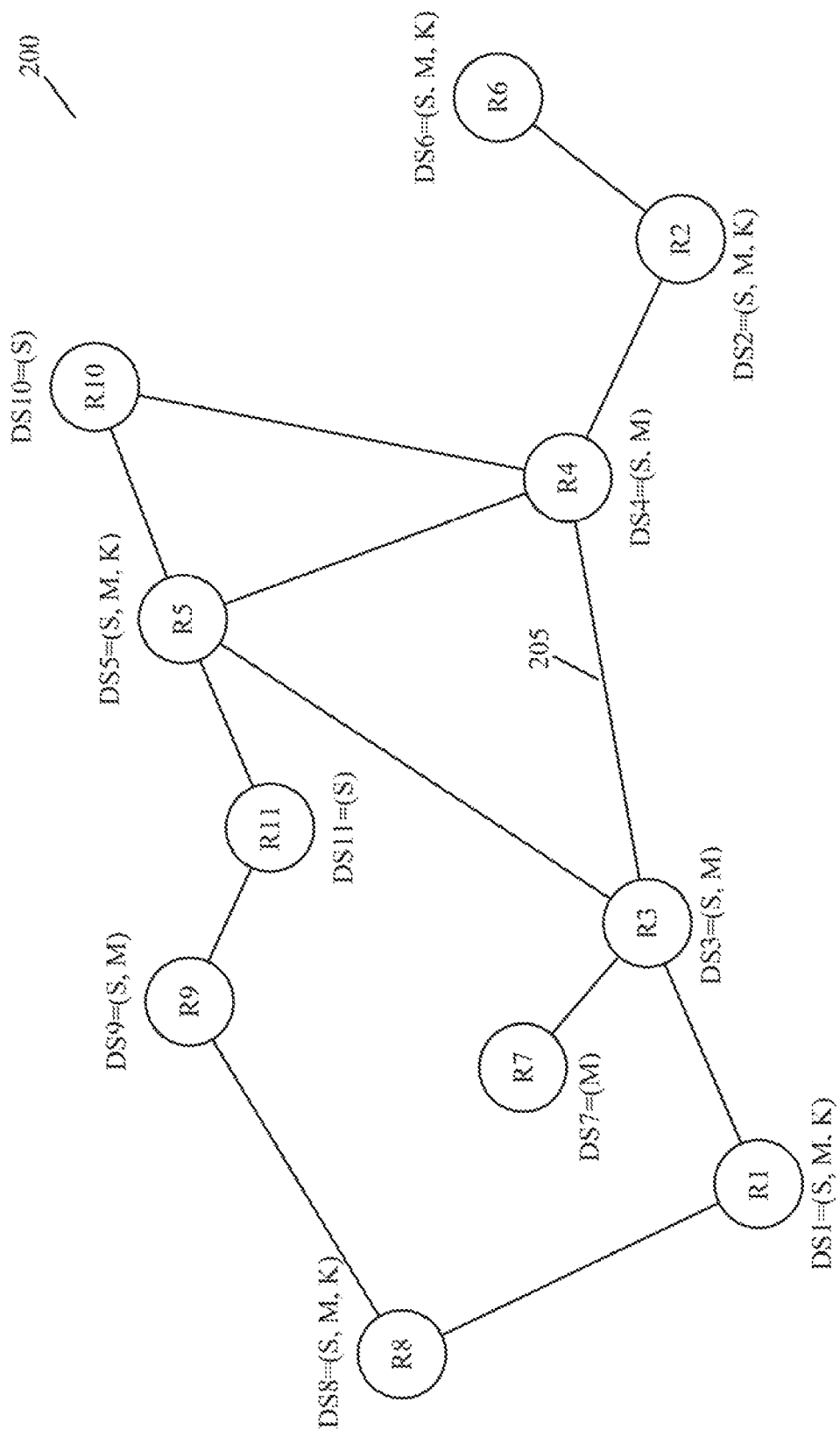
FIG. 2 illustrates an example of a graph defined by the process of FIG. 1 to represent a structural model of the infrastructure and services in a datacenter.

FIG. 2 illustrates an example of a graph 200 defined by the process 110 to represent a structural model of the infrastructure and services in a datacenter. In this figure, each node Rn represents a managed resource in a datacenter and has a data set DSn associated with it. The managed resources in some embodiments can be compute resources, network resources, storage resources, VNF resources, service resources, etc. Also, in some embodiments, the managed resources are physically or logically related to each other. In the graph 200, the relationship between a pair of resources is represented by a link 205 between the nodes that represent the pair of resource. As such, the nodes and the links create a topological graph of the resources and relationship between the resources in the datacenter.

The data set DSn for each node Rn can include deterministic set of symptoms (S), and non-deterministic telemetric set of metrics (M) and non-deterministic set of KPIs (K). In some embodiments, deterministic data is data that provides a definitive value regarding the operational state (e.g., active state or failed state) of a component, while non-deterministic data is data that provides a non-definite value regarding the operational state of a component. Also, in some embodiments, a metric data tuple includes a raw value associated with an instance in time, while KPI data includes processed (e.g., aggregated or averaged) data values that are generated from the metric values.

In some embodiments, different nodes (i.e., different components) can have different types of data sets. For example, few resources will have just the symptoms, while other might just have metrics. FIG. 2 illustrates examples of this variation by showing DS10 of resource R10 only having symptoms, DS7 of resource R7 only having metrics, DS3 of resource R3 having symptoms and metrics, and DS1 of resource R1 having symptoms, metrics and KPIs. In some embodiments, each type of data set can be represented by a multi-dimensional matrix.

In some embodiments, the process 100 builds the graph (such as graph 200) to represent monitored components in a datacenter by using existing deterministic processes that are used today to identify root causes for resource failures in a datacenter. One example of such an existing deterministic process is the SMARTS process, described in U.S. Pat. No. 5,528,516, U.S. Published Application 2004/0249610 and U.S. Published Application 2005/0021742. Such approaches use the deterministic nature of resource failure to define the datacenter graphs. Under these approaches, the data tuples associated with the nodes of the graphs are not only collected and generated but also are derived based on rules from one or more rules engines and based on one or more probabilistic models used by one or more statistical inference engines.

For example, when one port in an L2 port pair connection goes down, the other port also goes down as does the trunk connection between the ports, which in-turn impacts any other connected hosts through this connection. Accordingly, the deterministic processes of some embodiments use probabilistic models and statistical inference engines to specify the structural and failure behavior models of the datacenter infrastructure and services. To build its structural and failure behavior model, the process 100 in some embodiments uses a discovery process to transform the functions of the entire infrastructure and services into a topological graph, like graph 200 of FIG. 2, that represents the resources as nodes, their relationships as links, and the symptoms, metrics and KPIs as data sets associated with the nodes.

The process 100 collects, generates, and derives a large amount of data for a large number of components in the network. For root cause analysis of performance degradation, the amount of data can be especially large because unlike failure assessment, performance assessment does not just involve determinations of whether components have failed, but rather involves an assessment of whether functioning components are performing at lower level of efficiency defined along an analog or practically analog range of efficiency. As such, performance assessment depends on a large number of performance metrics and KPIs, each of which can span a large range of values. This problem is especially acute given the large number of components in the datacenter.

Hence, to do the root cause analysis for performance degradation, the process 100 has to filter out some of the identified components and associated data in order to be able to efficiently perform its analysis. Specifically, for a particular root cause analysis, the process eliminates (at 115) the components that are not relevant for this analysis, and (2) discards (at 120) the data tuples of the remaining components that are not relevant to the particular root cause analysis.

At 115, the process 100 in some embodiments filters out the components that are not relevant for the particular root cause analysis by identifying a portion of the datacenter graph (constructed at 110) that is relevant to the particular root cause analysis. The process 100 can use different techniques to perform its filtering of the graph. For instance, in some embodiments, the process can select one of the following three different techniques to identify the portion of the constructed datacenter graph that is relevant for a particular root cause analysis: (1) tenant isolation of the managed components, (2) network path isolation of the managed components for a set of one or more data-message endpoint pairs, and (3) L2/L3 component identification for a set of one or more data-message endpoint pairs. These techniques use structural and/or behavioral models to identify the relevant portion of the constructed graph to analyze.

Figure 3:
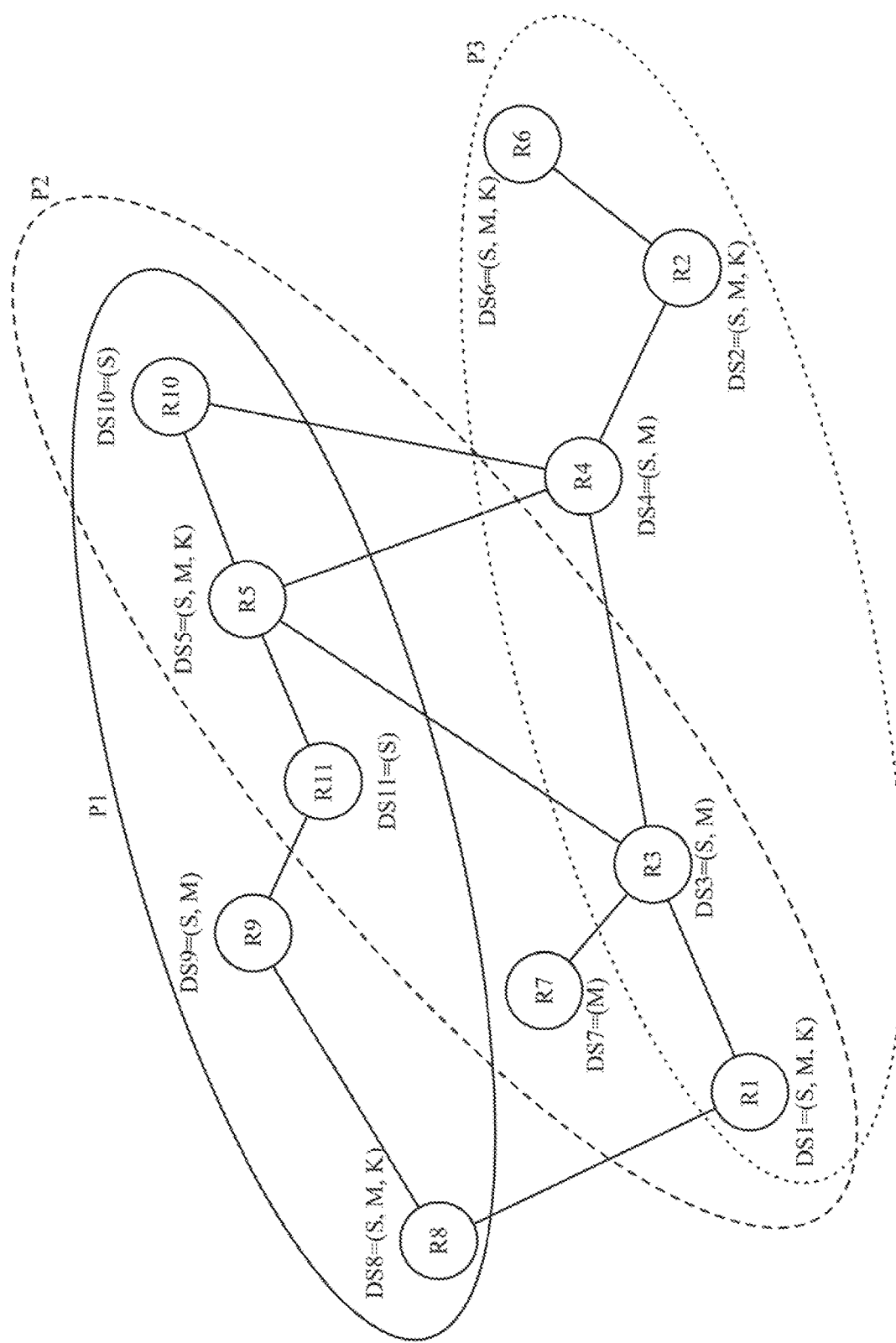
FIG. 3 illustrates examples of different portions of the graph of FIG. 2 that are identified using these three techniques.

FIG. 3 illustrates examples of different portions of the graph 200 that are identified using these three techniques. Tenant isolation of managed components for a particular root cause analysis identifies the portion of the constructed graph that is associated with a particular tenant for which the analysis is being performed. In some embodiments, the discovery process that is used to construct the graph associates the managed components (e.g., forwarding L2/L3 components, service components, etc.) with tags that identify the tenants that use the managed components. The shared managed components of a specific tenant in some embodiments are identified using the L2 and L3 networking constructs. At the end of the discovery, a topology can be defined and displayed to represent the tenant instance and its relation with the physical/logical managed components. In FIG. 3, the graph portion that is identified for a particular tenant is represented as portion P1, which includes in this example resources R5, R8, R9, R10, and R11 and their associated data tuples DS5, DS8, DS9, DS10, and DS11.

The network path isolation of the managed components identifies the portion of the constructed graph by using flow identifying techniques to identify one or more network traffic paths between one or more pairs of endpoints (e.g., VMs, containers, computers, etc.) in the datacenter. Examples of such flow identifying techniques that are used in some embodiments include NetFlow, sFlow, and deep packet inspection (DPI). Such flow identifying techniques can be used to extract the network traffic path for any given source and destination endpoints in the datacenter. In some embodiments, the network traffic path is overlaid on the constructed topological graph to identify a portion of the graph to analyze. In FIG. 3, the graph portion that is identified for a particular network path between two particular endpoints is represented as portion P2, which includes in this example resources R1, R3, R5, R7, R10 and R11, and their associated data tuples DS1, DS3, DS5, DS7, DS10 and DS11.

When tenant isolation is not a viable or desirable means for extracting the sub-graph to analyze, and neither is a flow identifying technique (such as NetFlow, sFlow, DPI, etc.), the process 100 can use L2/L3 network constructs to identify all possible network path for one or more pairs of source and destination endpoints. These identified network path can again be overlaid on the constructed topological graph to identify a portion of the graph to analyze. In FIG. 3, the graph portion that is identified for all possible paths between two particular endpoints is represented as portion P3, which includes in this example resources R1-R4 and R6 and their associated data tuples DS1-DS4 and DS6.

One of ordinary skill will realize that the process 100 uses other techniques in other embodiments to define the graph for which it should perform its root cause analysis. For example, instead of building a larger general graph for the datacenter, and then extracting a specific portion of the graph that is applicable to a specific root cause analysis problem, the process 100 in other embodiments builds a smaller initial graph that is just applicable to, or more specific to, the particular root cause analysis problem that it needs to examine.

After eliminating the component nodes of the constructed graph that are not relevant for a particular root cause analysis in order to identify the graph portion to analyze, the process 100 discards (at 120) the data tuples of the remaining component nodes that are not necessary for the particular root cause analysis. In some embodiments, the process 100 eliminates the unnecessary data tuples by (1) identifying data dependencies and data variations, and (20 using these identified dependencies/variations to reduce the data tuples for the remaining component nodes.

In some embodiments, the process 100 uses one or more statistical inference models to filter the data tuples (e.g., to reduce the non-deterministic data tuples). For instance, some of these models reduce variations in the data tuple values associated with a node in the extracted graph based on variations of data tuple values for the same node as well as data tuple values for other nodes in the extracted graph. The data tuples associated with the remaining component nodes may or may not depend on each other. Data tuple variations generally depends on the variations of many other dependent/independent data tuples. So, the variation of data tuples has to be seen with respect to the other dependent/independent data tuples. This is a typically a multivariate analysis.

Different embodiments use different types of multivariate analytical processes. Examples of such processes include (1) descriptive models such Principal Component Analysis (PCA), Basic Statistics, Clustering, (2) regression and predictive models, such Multiple Linear Regression (MLR), Principal Component Regression (PCR), Partial Least Squares Regression (PLSR), and (3) classification models, such as SIMCA (PCA, PLSR), Support Vector Machine (SVM), Linear Discriminant Analysis (LDA), Partial Least Squares-Discriminant Analysis (PLS-DA).

Figure 4:
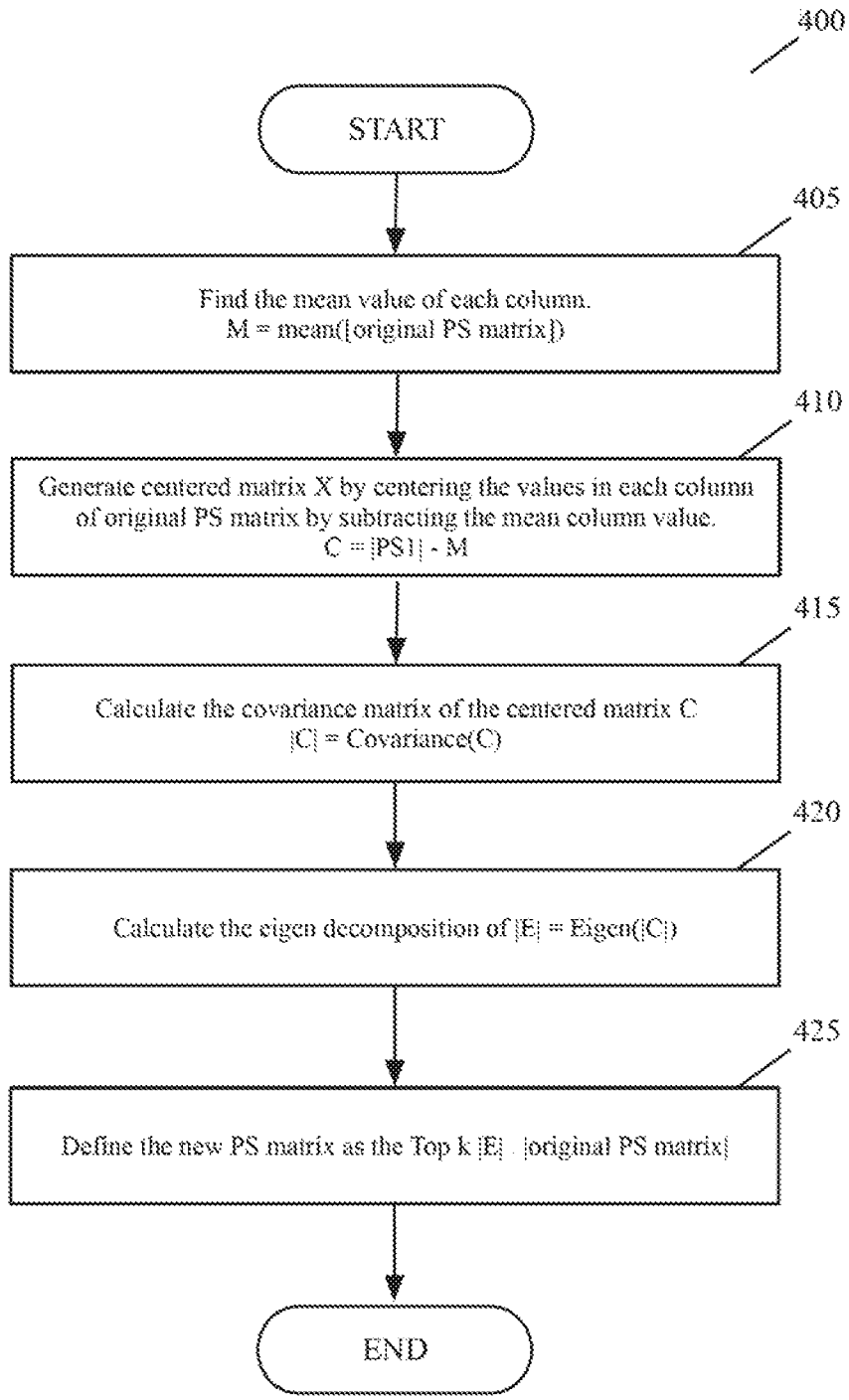
FIG. 4 illustrates an example of an analytical process used to filter the data tuples that it needs to analyze for its root cause analysis.

FIG. 4 illustrates an example of a PCA analytical process 400 that the process 100 uses (at 120) to reduce the data tuples that it needs to analyze for its root cause analysis. When this process is performed for the graph portion P1 of FIG. 3 (which includes components R5, R8, R9, R10, R11), it can reduce the following initial problem-space matrix PS1 from a 5-by-n (5×N) dimension, $$PS1 = \begin{pmatrix} R5s1 & R5m2 & R5k3 & \ldots & R5mn \\ R8s3 & R8m4 & R8m6 & \ldots & R8kn \\ R9s10 & R9k6 & R9m5 & \ldots & R9sn \\ R10s3 & R10m4 & R10m6 & \ldots & R10kn \\ R11s3 & R11m4 & R11m6 & \ldots & R11kn \end{pmatrix}$$

to the following reduced 5×p form $$PS1' = \begin{pmatrix} R5m3 & R5s3 & R5k1 \\ R8s1 & R8k2 & R8m1 \\ R9m4 & R9m8 & R9m10 \\ R10s2 & R10s4 & R10s6 \\ R11s8 & R11m2 & R11k2 \end{pmatrix}$$

where p is an integer less than n (in this example, p being 3).

As shown, the process 400 initially computes (at 405) a mean value for each column in the initial problem-space (PS) matrix of the graph portion being analyzed. In the above-example, the problem-space matrix PS1 expresses the data tuples associated with the component nodes of the graph portion P1. Next, at 410, the process 400 defines a centered matrix C as the PS matrix with each of its value in each column centered by subtracting from each value in a column the mean for that column. At 415, the process 400 calculates the covariance matrix of the centered matrix C.

The process 400 then calculates (at 420) the eigen decomposition of the covariance matrix. Finally, it defines (at 425) the simplified PS' matrix as the dot product of the Top k of the eigen decomposition matrix and the original PS matrix.

The process 400 in some embodiments is performed periodically (e.g., every minute, every five minutes, every ten minutes, etc.). In each iteration's period, the process in some embodiments is performed using one set of data tuple values that are associated with one instance in time in that period. Under this approach, the data reduction can result in different filtering of the data tuples and different sets of remaining data tuples for different periods (e.g., different member tuples in the reduced data tuple matrix of different periods). In other embodiments, the process 400 performs its analysis to identify the reduced data tuples in each period based on data aggregated or averaged over the period or over several periods. Relying on the aggregated or averaged data to identify the reduced data tuples reduces the fluctuation in the data tuples that the process 400 identifies for analysis (e.g., for the reduced data tuple matrix).

After reducing the number of data tuples to analyze, the process 100 then analyzes (at 125) the remaining data tuples to determine whether it detects an anomaly in the remaining data tuples that might be due to a potential performance degradation of one or more components. In some embodiments, an identified anomaly in one or more data tuple values is associated with an instance in time, which is a candidate instance for which the process 100 can perform its root cause analysis to determine whether detected data-tuple anomaly corresponds to a performance degradation that the process 100 can identify.

To detect anomaly on the reduced data tuples for the component nodes of the remaining portion of the graph, the process 100 uses different data analysis processes in different embodiments. Examples of such data analysis processes include (1) clustering-based processes, such as DBSCAN, K-Medoids, K-Means, Farthest-First clustering with alpha/beta segmentation, (2) nearest neighbor based processes, such as K-Nearest Neighbor (KNN), Local Outlier Factor (LOF), Local Outlier Probability (LOP), Shared Nearest Neighbors (SNN), (3) statistics-based processes, such as Histogram Based Outlier Score (HBOS), Box Plot Rule (Tukey), Markov Chain, Grubbs Test, Gaussian distribution, Seasonal Hybrid ESD, and (4) forecasting/prediction based processes, such as ARIMA, Exponential Smoothing (ETS), Mean/Naïve/Drift/Seasonal Naïve.

Consider the reduced problem-space matrix PS1' data tuples as an example:

$$PS1' = \begin{pmatrix} R5m3 & R5s3 & R5k1 \\ R8s1 & R8k2 & R8m1 \\ R9m4 & R9m8 & R9m10 \\ R10s2 & R10s4 & R10s6 \\ R11s8 & R11m2 & R11k2 \end{pmatrix}$$

Figure 5:
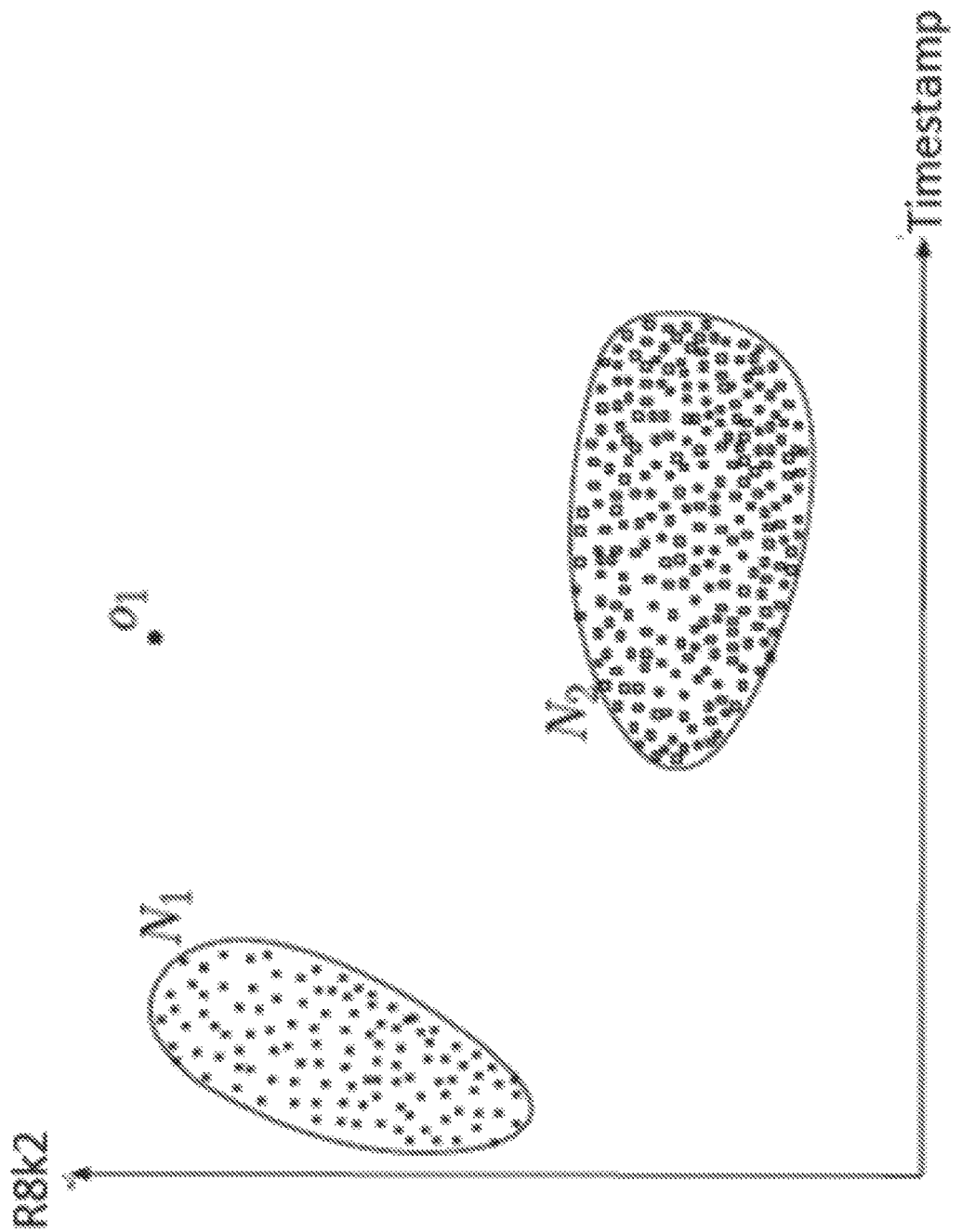
FIG. 5 illustrates the detection of an anomaly through the clustering of data tuple values.

For simplicity, FIG. 5 illustrates a simple example for finding an anomaly in an individual data tuple R8k2 in this matrix PS1'. In this example, the result of the clustering on R8k2 data tuple shows two normal clusters N1 and N2 of data values for this data tuple, and one anomalous data point O1 for this data tuple. Hence, by applying one of the above-mentioned data-analysis processes to the R8k2 data tuple in the reduced problem-space matrix PS1', the process 100 identifies (at 125) an anomaly data point O1 in the values for this data tuple at a particular instance in time.

Even though FIG. 5 illustrates an example of a detected anomaly in an individual data tuple, one instance in time can be associated with anomalies in multiple analyzed data tuples simultaneously.

Upon identifying (at 125) a time instance for which the associated, analyzed data tuples (that remain after the filtering at 120) include at least one anomaly, the process 100 generates (at 130) a digital signature to represent the associated, analyzed data tuples, and compares (at 135) this signature with each of several pre-tabulated signatures in a codebook. Each codebook signature is associated with a root cause problem (e.g., a reason) for the performance degradation of one or more components in the datacenter. As further described below, the root cause problem of the codebook signature that is closest to the generated signature for the associated/analyzed data is identified as the root cause of the detected anomaly. In some embodiments, the root cause of the performance degradation of a first set of one or more components can include the performance degradation of a second set of one or more components in the datacenter. Conjunctively, or alternatively, the root cause of the performance degradation of a first set of one or more components in some embodiments can include the failure of a second set of one or more components in the datacenter, or some other reason (such as too much load on one or more host computers, forwarding elements, and/or service appliances).

To generate a signature for a set of analyzed data tuples for a time instance associated with anomalies in one or more of these data tuples, the process 100 uses a signature generator. For each analyzed data tuple at this time instance, the generator in some embodiments specifies a "1" in the signature when the data tuple value at this time is anomalous and specifies a "0" in the signature when the data tuple value at this time is not anomalous. In other embodiments, the generator specifies a "0" in the signature when the data tuple value at a time instance is anomalous and specifies a "1" in the signature when the data tuple value at this time is not anomalous.

Figure 6:
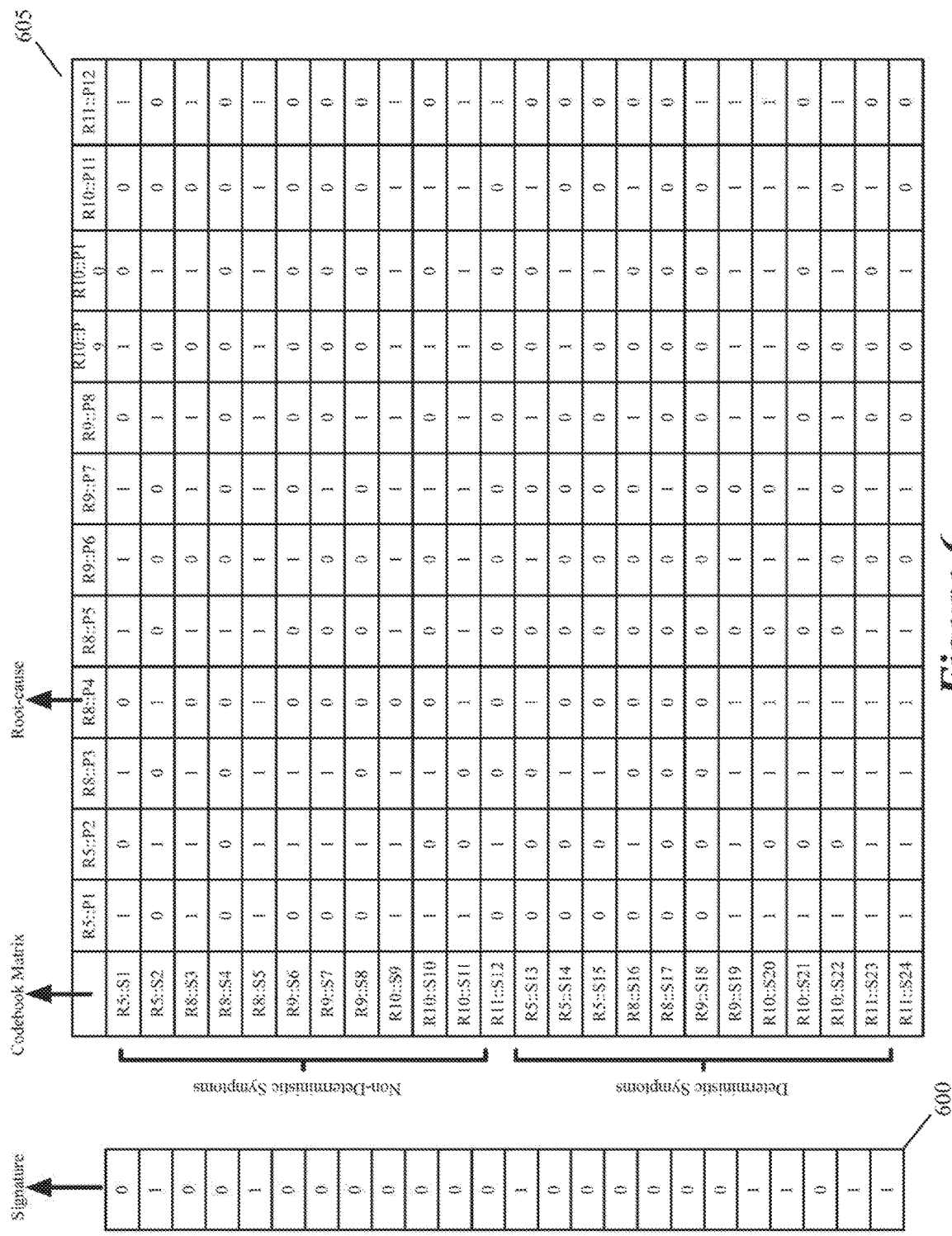
FIG. 6 illustrates an example of a digital signature and a codebook.

FIG. 6 illustrates an example of a digital signature 600 and a codebook 605. As shown, the digital signature 600 has several rows of cells arranged in one column, with the rows corresponding to deterministic and non-deterministic symptoms data tuples. Each cell can have a value "1," which specifies that symptom represented by that cell is active, or a value "0," which specifies that symptom represented by that cell is inactive. The non-deterministic symptoms are binary values associated with metrics and/or KPI data tuples that are specified based on whether the metric and/or KPI data tuples are anomalous (e.g., are "1" in the signature when the data tuple values are anomalous and "0" in the signature when the data tuple values are not anomalous). The deterministic symptoms are binary values associated with whether a component (e.g., a resource) has failed or is still operational.

The codebook 605 has a similar structure, except that it has multiple signatures. Specifically, as shown, the codebook 605 includes several rows and columns, with the rows corresponding to symptoms and the columns corresponding to problems. In this example, each cell at the intersection of each column and row in the codebook can have a value "1," which specifies that symptom represented by that cell is active, or a value "0," which specifies that symptom represented by that cell is inactive. In the codebook matrix, Rn::Pn represents the problems (Pn) of managed resource (Rn), while Rn::Sn represents the symptoms (Sn) of managed resource (Rn). In this nomenclature, resource is used interchangeably with component.

The performance monitoring system of some embodiments pre-tabulates the codebook signatures by observing the operation of the datacenter component, detecting conditions and generating signatures for these conditions. In other embodiments, the performance monitoring system pre-tabulates the codebook signatures by emulating/simulating conditions (in software) and generating signatures for these emulated/simulated conditions.

As shown in FIG. 6, each component (e.g., resource R5) can have multiple symptoms, some of which are deterministic symptoms corresponding to deterministic associated data tuples and non-deterministic symptoms corresponding to non-deterministic associated data tuples. An example of a component with multiple symptoms is a VM that has several deterministic symptoms (such as its power state, network connectivity, VNIC state, etc.) and several non-deterministic symptoms (such CPU usage, memory consumption, etc.).

As mentioned above, the process 100 (at 135) compares the signature generated at 130 with each of the pre-tabulated signatures in the codebook, identifies the codebook signature that is closest to the generated signature, and selects the root cause problem of the identified codebook signature as the root cause of the detected anomaly. In some embodiments, the process 100 quantifies the proximity of the generated signature to the codebook signatures by computing the hamming distance between the generated signature and each of the codebook signature. The codebook signature that generates the smallest hamming distance is the codebook signature that is closest to the generated signature. In the example illustrated in FIG. 6, the problem P4 associated with resource R8 is the signature that is closest to the generated signature, and hence is identified as the root cause of the detected data anomaly.

In some embodiments, the process 100 performs thresholding to ensure that it does not incorrectly identify a root cause when none of the pre-tabulated signatures is sufficiently close to the generated signature. Specifically, in these embodiments, the process compares the smallest computed hamming distance between the generated signature and the pre-tabulated signatures with a threshold value. When the smallest computed hamming distance is not equal or less than the threshold value, the process does not identify a root cause for the detected anomaly.

Figure 7:
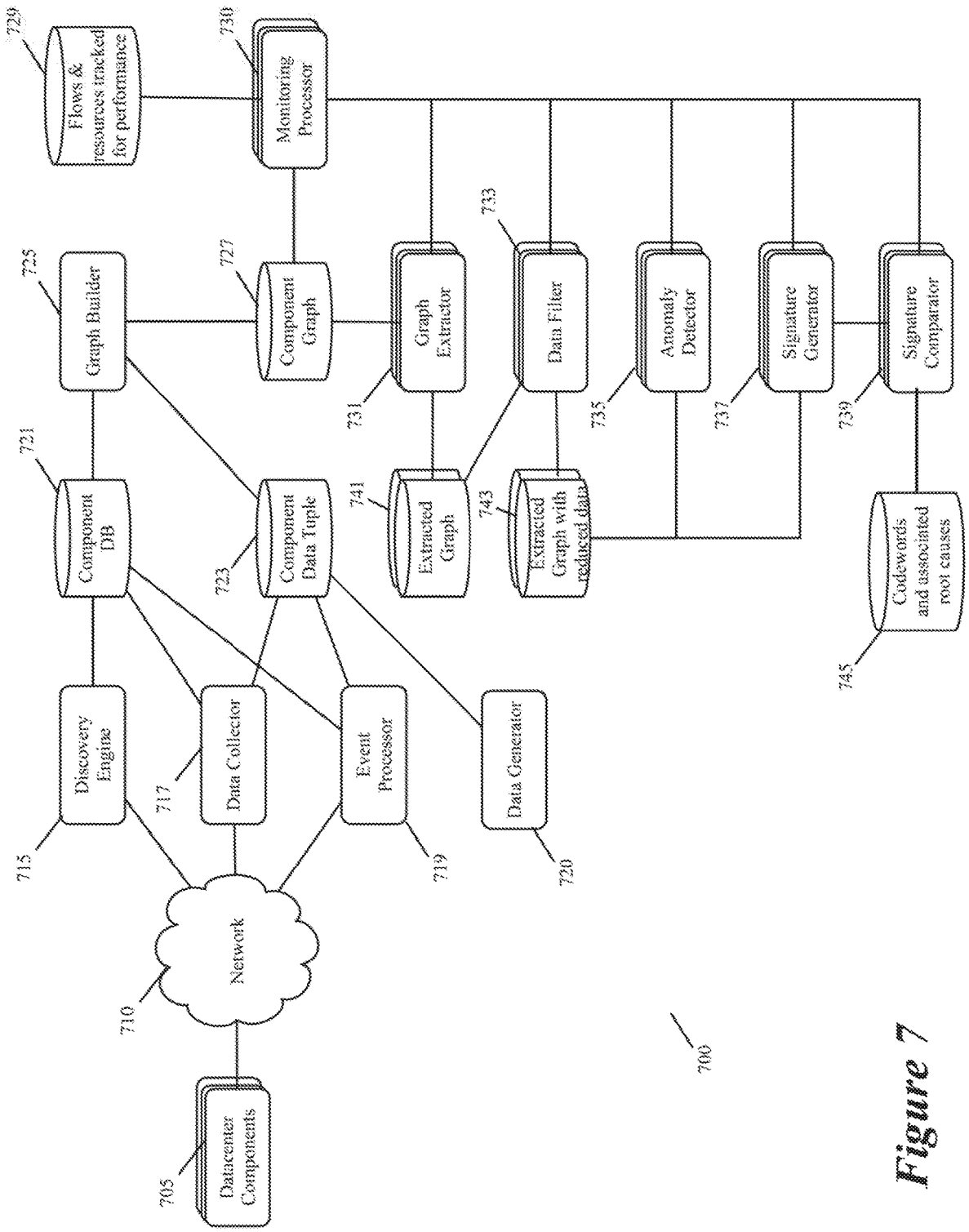
FIG. 7 illustrates a performance monitoring system of some embodiments.

FIG. 7 illustrates a performance monitoring system 700 that performs the process 100 in some embodiments to identify root causes for degradation in performance of one or more components 705 in a datacenter. As shown, the monitoring system 700 has numerous modules and data stores 715-745 that execute on one or more computers. These computers are in the datacenter in some embodiments, outside of the datacenter in other embodiments, and partially inside and outside of the datacenter in still other embodiments.

As shown, the modules of the monitoring system 100 include a discovery engine 715, a data collector 717, an event processor 719, a data generator 720, a graph builder 725, a monitoring processor 730, a graph extractor 731, a data filter 733, an anomaly detector 735, a signature generator 737, and a signature comparator 739. Each of these modules can be a single module executing on one computer, or it can be multiple modules executing on multiple computers. Similarly, each data store (e.g., each database) used by these modules can be a single data store residing on one computer, or multiple data stores residing on multiple computers.

The discovery engine 715 identifies components in the network and relationships between these components, and stores this information in the component database 721. In some embodiments, the discovery engine 715 uses known techniques to gather this information. Data regarding the operation and performance of these components are gathered by the data collector 717 and the event processor 719, which store their collected information in the component data store 721 or a related data store 723.

In some embodiments, the data collector 717 pulls this data from the components or from other resources in the datacenter that control or manage these components. On the other hand, the event processor 719 in some embodiments receives event notifications that contain performance data for the components that is associated with monitored events in the datacenter, or in response to such event notification, retrieve performance data regarding the components. The data generator 720 processes the collected data, and generates additional data (e.g., aggregated data, rate data, KPI data, etc.) from the collected data. In some embodiments, the discovery engine 715, the data collector 717, the event processor 719 and the data generator 720 iteratively (e.g., continuously, periodically and/or on-demand) perform their operations to ensure that the data collected for the datacenter components is up to date.

The graph builder 725 in some embodiments generates a graph of the components in the datacenter and stores this component graph in the graph storage 727. For each node in this graph, the graph builder identifies a set of deterministic and/or non-deterministic data tuples related with the node's component and associates the data tuple set with the node. The graph builder also updates the component graph periodically, or on demand based on changes to the datacenter components.

The monitoring system 700 in some embodiments has multiple monitoring processors 730, each of which monitors a set of one or more flows or a set of one or more tracked resources for performance degradation. These tracked flows and resources are identified in the data store 729. In some embodiments, a separate monitoring processor 730 is instantiated for each tracked flow or resource. The tracked flows can be high priority flows, e.g., flows between two high priority machines, or flow emanating from one high priority machine. Similarly, the tracked resources can be high priority resources, e.g., VMs that execute high priority applications.

In some embodiments, each monitoring processor 730 has its own associated graph extractor 731, data filter 733, anomaly detector 735, signature generator 737, and signature comparator 739 to detect performance degradation associated with its tracked flow or resource, and to identify the root cause for any detected performance degradation. For a monitoring processor 730, the graph extractor 731 (1) identifies the portion of the graph that is relevant to the flow or resource that the monitoring processor is tracking, and (2) stores this graph portion in the extracted graph storage 741. In some embodiments, the graph extractor 731 uses one of the following three different techniques to identify the portion of the constructed datacenter graph that is relevant for it monitoring processor: (1) tenant isolation of the managed components, (2) network path isolation of the managed components for a set of one or more data-message endpoint pairs, and (3) L2/L3 component identification for a set of one or more data-message endpoint pairs.

After the graph extractor identifies the portion of the graph to analyze, the monitoring processor 730 has its data filter 733 discard the data tuples of the extracted graph's component nodes that are not necessary for its monitoring processor's root cause analysis. In some embodiments, the data filter eliminates the unnecessary data tuples by identifying data dependencies and data variations, and using these identified dependencies/variations to reduce the data tuples for the remaining component nodes. As mentioned above, some embodiments use one or more statistical inference models (such as PCA) to do this.

After the number of data tuples for analysis have been reduced, the monitoring processor has its anomaly detector 735 analyze the remaining data tuples to determine whether it detects an anomaly in the remaining data tuples that might be due to a potential performance degradation of one or more components. When the anomaly detector 735 identifies an anomaly in the extracted graph's data tuples, the monitoring processor 730 has its signature generator 737 produce a digital signature to represent the graph's analyzed data tuples at the instance in time that the anomaly is detected, and then has its signature comparator 739 compare this signature with each of several pre-tabulated signatures in its codebook that is stored in the data store 745.

The signature comparator 739 identifies the codebook signature that is closest (e.g., has the smallest hamming distance) to the generated signature, and selects the root cause problem of the identified codebook signature as the root cause of the detected anomaly. The identified root cause in some embodiments specifies one possible reason for the identified degradation of performance of one or more components. In other embodiments, the root cause identifies a set of two or more reasons for the identified performance degradation of one or more components.

Figure 8:
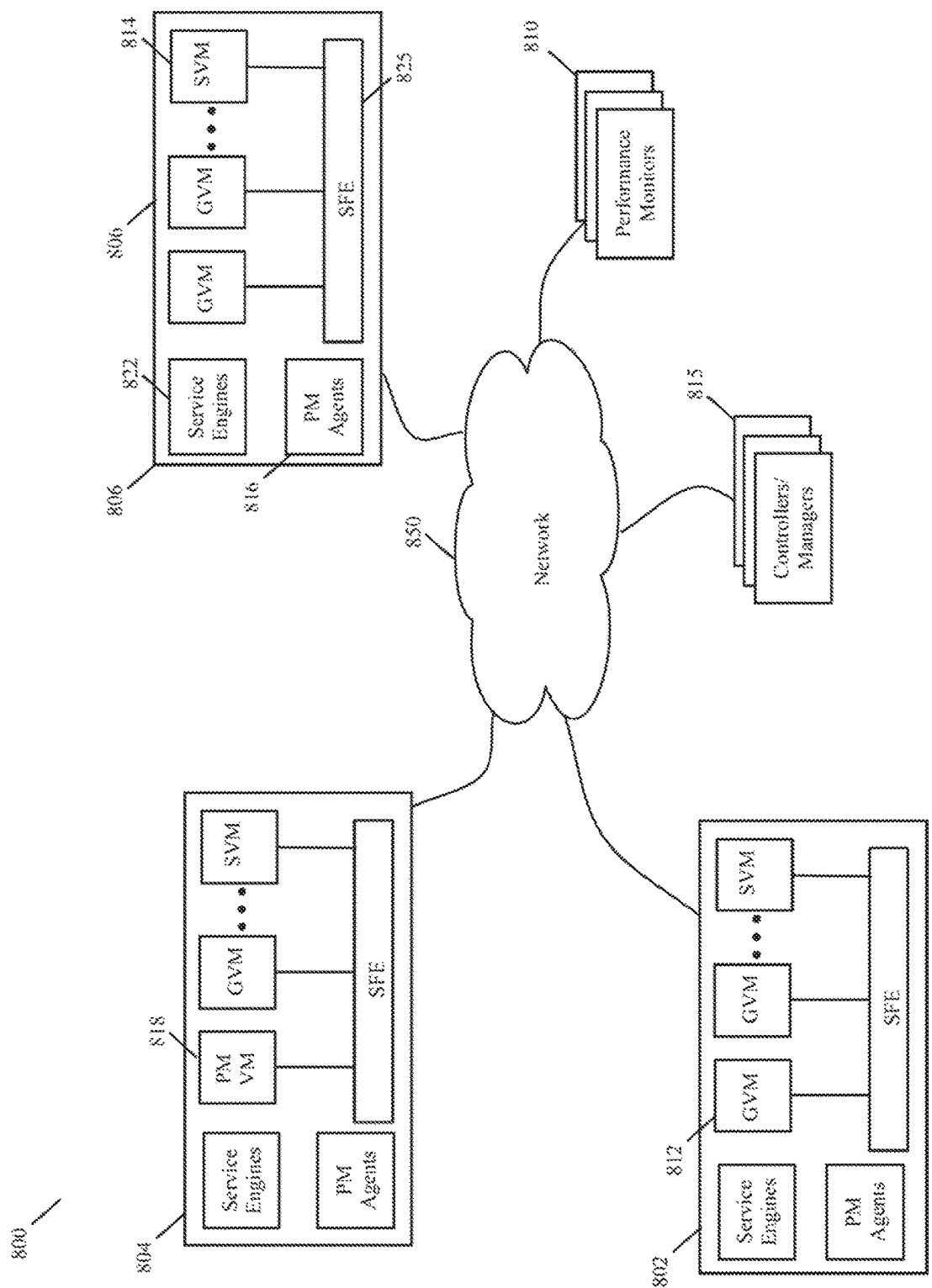
FIG. 8 illustrates a datacenter that uses the performance monitoring system of some embodiments.

FIG. 8 illustrates an example of a multi-host datacenter 800 that uses the performance monitoring system 700 of some embodiments. This figure illustrates three hosts 802-806 connected to a network 850 of the datacenter 800. As shown, each host in some embodiments executes one or more guest VMs (GVMs) 812, service VMs (SVMs) 814, service engines 822, performance monitoring (PM) agents 816, performance monitoring VMs 818, and software forwarding elements (SFEs) 825. Through the SFEs, the various VMs in some embodiments communicate with other VMs on the same host computers or different host computers. Examples of such SFEs are software switches and/or routers. The SFEs implement logical forwarding elements in some embodiments.

FIG. 8 also illustrates a set of managers and controllers 815 for managing and controlling the service VMs, service engines, GVMs, and SFEs. These managers/controllers communicate with the hosts through the network 850, which is a local area network in some embodiments, while in other embodiments is a wide area network or a network of networks (such as the Internet). Through this network 850, one or more performance monitoring servers/appliances 810 communicate with the hosts 802-806 and the managers/controllers 815 to collect performance monitoring data. This data in some embodiments is collected by PM agents 816 and/or PMVMs 818 executing on the host computers 802-806. Conjunctively, or alternatively, the performance monitoring data in some embodiments is collected from other modules (e.g., SFEs, service engines, SVMs) executing on the host computers, and/or from the managers/controllers 815.

The performance monitoring servers/appliances 810 in some embodiments implement the modules and storages 715-745 of the performance monitoring system 700 of FIG. 7. In some embodiments, some or all of these modules and/or storages 715-745 are implemented by the PMVMs executing on the host computers 802-806. Also, in some embodiments, the performance monitoring system 700 provides a user interface for the administrators to query performance data and/or to view reports regarding the performance data.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
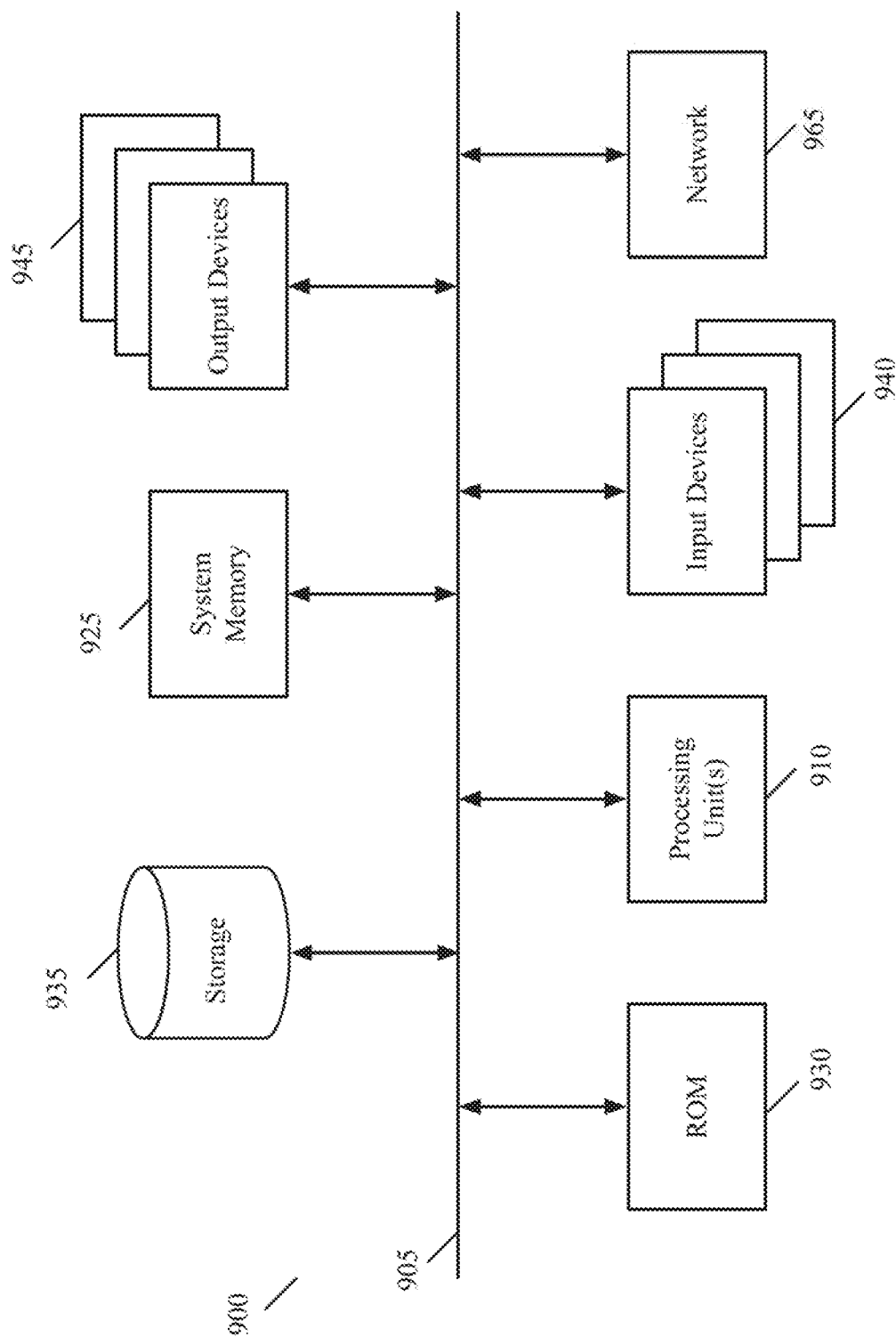
FIG. 9 illustrates a computer system for executing processes of some embodiments of the invention.

FIG. 9 conceptually illustrates a computer system 900 with which some embodiments of the invention are implemented. The computer system 900 can be used to implement any of the above-described computers and servers. As such, it can be used to execute any of the above described processes. This computer system includes various types of non-transitory machine readable media and interfaces for various other types of machine readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments. The read-only-memory (ROM) 930 stores static data and instructions that are needed by the processing unit(s) 910 and other modules of the computer system. The permanent storage device 935, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the computer system. The input devices 940 include alphanumeric keyboards and pointing devices (also called "cursor control devices"). The output devices 945 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples computer system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method of identifying a root cause for performance degradation in a network comprising a set of components, the method comprising:
    collecting, for the set of components, performance quantifying data tuples to potentially use in performance-degradation monitoring of the set of components, wherein rather than simply specifying whether a particular component has a failed operational state or an active operational state, said collected performance quantifying data tuples for the particular component specify whether the particular component that is operational is operating at a reduced operational efficiency, said collected data tuples for the particular component comprising a plurality of data tuples;
    due to a size of the plurality of data tuples that have to be assessed for the performance-degradation monitoring, identifying, from the set of components, a subset of components for performance-degradation monitoring, the identified subset of components having fewer components than the set of components;
    selecting, from the collected data tuples, a smaller set of the collected data tuples to analyze that is associated with the identified subset of components;
    generating a digital signature from the selected data tuples, said generated digital signature comprising a plurality of values associated with the plurality of data tuples for the particular component; and
    comparing the generated digital signature with pre-tabulated digital signatures to identify a root cause of a performance degradation of the particular component that is operational but operating at a reduced operational efficiency.

2. The method of claim 1, wherein identifying the subset of components comprises:
    to represent the set of components, generating a first graph comprising a node for each component in a set of nodes and a link between each pair of nodes representing a pair of components that have a relationship;
    associating data regarding an operation of each component in the set of components with the node of the graph associated with that component; and
    from the first graph, extracting a smaller, second graph that includes the node for each component in the subset of components for performance monitoring.

3. The method of claim 2, wherein:
    the identified subset of components are components associated with a particular tenant in a multi-tenant datacenter; and
    extracting the second graph comprises identifying a set of nodes in the first graph that are associated with an identifier associated with the particular tenant and a set of links between the identified nodes.

4. The method of claim 2, wherein:
the identified subset of components are components associated with a set of one or more packet flows through the network; and
extracting the second graph comprises identifying a set of nodes in the first graph that are associated with the set of one or more packet flows and a set of links between the identified nodes.

5. The method of claim 2, wherein:
the identified subset of components are components associated with a set of one or more paths through the network between a pair of machines; and
extracting the second graph comprises identifying a set of nodes in the first graph that are associated with the set of one or more paths and a set of links between the identified nodes.

6. The method of claim 2, wherein identifying the subset of components further comprises discarding a portion of data associated with the nodes of the extracted second graph.

7. The method of claim 6, wherein discarding a portion of the data comprises using a statistical inference model to discard the data.

8. The method of claim 1, wherein the set of components comprises machines executing on computers and network forwarding elements.

9. The method of claim 1, wherein the collected data tuples comprise resource consumption data including bandwidth consumption data, processor consumption data, and memory consumption data.

10. A non-transitory machine readable medium storing a program for identifying a root cause for performance degradation in a network comprising a set of components, the program comprising sets of instructions for:
collecting, for the set of components, performance quantifying data tuples to potentially use in performance-degradation monitoring of the set of components, wherein rather than simply specifying whether a particular component has a failed operational state or an active operational state, said collected performance quantifying data tuples for the particular component specify whether the particular component that is operational is operating at a reduced operational efficiency, said collected data tuples for the particular component comprising a plurality of data tuples;
due to a size of the plurality of data tuples that have to be assessed for the performance-degradation monitoring, identifying, from the set of components, a subset of components for performance-degradation monitoring, the identified subset of components having fewer components than the set of components;
selecting, from the collected data tuples, a smaller set of the collected data tuples to analyze that is associated with the identified subset of components;
generating a digital signature from the selected data tuples, said generated digital signature comprising a plurality of values associated with the plurality of data tuples for the particular component; and
comparing the generated digital signature with pre-tabulated digital signatures to identify a root cause of a performance degradation of the particular component that is operational but is operating at a reduced operational efficiency.

11. The non-transitory machine readable medium of claim 10, wherein the set of instructions for identifying the subset of components comprises sets of instructions for:
to represent the set of components, generating a first graph comprising a node for each component in a set of nodes and a link between each pair of nodes representing a pair of components that have a relationship;
associating data regarding an operation of each component in the set of components with the node of the graph associated with that component; and
from the first graph, extracting a smaller, second graph that includes the node for each component in the subset of components for performance monitoring.

12. The non-transitory machine readable medium of claim 11, wherein:
the identified subset of components are components associated with a particular tenant in a multi-tenant datacenter; and
the set of instructions for extracting the second graph comprises a set of instructions for identifying a set of nodes in the first graph that are associated with an identifier associated with the particular tenant and a set of links between the identified nodes.

13. The non-transitory machine readable medium of claim 11, wherein:
the identified subset of components are components associated with a set of one or more packet flows through the network; and
the set of instructions for extracting the second graph comprises a set of instructions for identifying a set of nodes in the first graph that are associated with the set of one or more packet flows and a set of links between the identified nodes.

14. The non-transitory machine readable medium of claim 11, wherein:
the identified subset of components are components associated with a set of one or more paths through the network between a pair of machines; and
the set of instructions for extracting the second graph comprises a set of instructions for identifying a set of nodes in the first graph that are associated with the set of one or more paths and a set of links between the identified nodes.

15. The non-transitory machine readable medium of claim 11, wherein the set of instructions for identifying the subset of components further a set of instructions for comprises discarding a portion of data associated with the nodes of the extracted second graph.

16. The non-transitory machine readable medium of claim 15, wherein the set of instructions for discarding a portion of the data comprises a set of instructions for using a statistical inference model to discard the data.

17. The non-transitory machine readable medium of claim 10, wherein the set of components comprises machines executing on computers and network forwarding elements.

18. The non-transitory machine readable medium of claim 10, wherein the collected data tuples comprise packet drop data.

* * * * *